United States Patent [19]
Schumann et al.

[11] Patent Number: 5,299,675
[45] Date of Patent: Apr. 5, 1994

[54] POUCH FEEDER METHOD AND DEVICE WITH ANGLED RIM

[75] Inventors: Benny C. Schumann, Coon Rapids; Donald E. Giorgio, Fridley, both of Minn.

[73] Assignee: T L Feeding Systems, Inc., Minneapolis, Minn.

[21] Appl. No.: 978,032

[22] Filed: Nov. 18, 1992

Related U.S. Application Data

[63] Continuation of Ser. No. 612,065, Nov. 9, 1990, abandoned.

[51] Int. Cl.⁵ .............................................. B65G 47/24
[52] U.S. Cl. .................................... 198/392; 198/416
[58] Field of Search ................................ 198/392, 416

[56] References Cited

U.S. PATENT DOCUMENTS

| | | | |
|---|---|---|---|
| 3,735,859 | 5/1973 | Miller | 198/392 |
| 4,007,854 | 2/1977 | Ervine | 198/392 X |
| 4,709,798 | 12/1987 | Herzog | 198/392 X |
| 4,830,172 | 5/1989 | Hilton et al. | 198/392 |
| 4,848,559 | 7/1989 | Hoppman et al. | 198/392 |
| 4,921,106 | 5/1990 | Spatafora et al. | 198/392 X |
| 5,044,487 | 9/1991 | Spatafora et al. | 198/392 |

FOREIGN PATENT DOCUMENTS

| | | | |
|---|---|---|---|
| 0161213 | 12/1981 | Japan | 198/392 |
| 0231307 | 9/1990 | Japan | 198/392 |

*Primary Examiner*—D. Glenn Dayoan
*Attorney, Agent, or Firm*—Merchant, Gould, Smith, Edell, Welder & Schmidt

[57] ABSTRACT

A precision feeding device for soft and hard packaged articles includes an angled rim for improved feeding and alignment. Separated rollers are placed between a rigid plate and a flexible disc to further enhance the operation and durability of the device.

7 Claims, 4 Drawing Sheets

POUCH FEEDER METHOD AND DEVICE WITH ANGLED RIM

This is a continuation of application Ser. No. 07/612,065, filed Nov. 9, 1990, now abandoned.

TECHNICAL FIELD OF THE INVENTION

This invention relates to large capacity precision feeders. More specifically, this invention relates to large capacity centrifugal precision feeders which are utilized to handle and orient large quantities of products or parts for ready packaging and boxing.

SUMMARY OF THE INVENTION

The present invention relates to a large capacity centrifugal precision feeder which can be utilized to aid in packaging, for instance, food, medical, pharmaceutical and military special handling products. A product package feeder comprises a bowl to which a substantially circular, angled rim is attached. Grooves are positioned on the angled rim, one being near the inner edge of the angled rim, and the other being located near the outer edge of the angled rim. A position tooling ring is located within the inner-most groove on the rim. An orienting tooling ring is located in the outer-most groove on the angled rim. A heavy, preferably rubber, flexible disc is located in the center of the tub or bowl, and rotates in a spinning pattern upon activation of motors. A metallic plate underneath the heavy rubber flexible disc has numerous free-spinning divided rollers to reduce the friction and break the surface tension between the metallic plate and the heavy rubber, flexible disc.

The packets or pouches which are being processed for packaging are metered into the centrifugal precision feeder, with placement on the flexible disc located in the center of the bowl. Upon activation of the motors, the flexible disc rotates, which further causes the packets to rotate around the circumference of the bowl. This rotation generates a centrifugal force which acts upon the packets. After a period of time, the centrifugal force causes each packet to align in an upright position along the position tooling ring, with one edge of the packet or pouch resting on a surface of the angled rim. Each package is then tripped and falls flat onto the angled rim, thereby becoming aligned.

BACKGROUND OF THE INVENTION

In many industries, various parts or products are placed into packets or pouches for health, sterile, convenience or protective reasons. These pouches or packets are then placed in large quantity boxes or other containers for ultimate delivery to the consumer or customer. Currently, placement of the pouches or packets into the boxes or other shipping containers is done by hand, which is labor intensive and time consuming.

Since the vast majority of packaging companies currently feed the packets or pouches by hand into the boxes or shipping containers, centrifugal precision feeders have been developed to aid in this process. Precision feeders, such as Hoppman Corporation model FT-40 or FT-50, utilize a large outer bowl rotating at one speed and a flexible inner disc rotating at another speed to create centrifugal force. The packets or pouches to be packaged are placed on the flexible inner disc and are transferred from the inner disc to an independently rotating orienting rim for delivery to the packaging station. The orienting rim has a flat, level surface. When the packets are transferred from the inner disc to the flat rim, the packages are often skewed in numerous directions. This skewed orientation of the packets or pouches at the packaging station prevents rapid packaging of these packets or pouches since time must be expended to straighten and correctly orient the packages or pouches before they are placed in the containers.

In the currently available precision feeders, the flexible inner disc is positioned over a metallic plate. In order to reduce the friction between the flexible inner disc and the metallic plate, a powder, such as talcum powder, must be placed therebetween. If no powder is utilized, the flexible inner disc may be torn and ripped due to friction. The flexible inner disc spins over the stationary metallic plate, which creates surface tension. This surface tension causes the flexible disc to stick to the plate, and since a center shaft is trying to turn the flexible disc, it can get twisted, with the flexible disc tearing near the center hub, thereby requiring frequent replacement. However, use of a powder between the flexible inner disc and the plate creates other problems in sterile environments or when used in the processing of sterile products because the powder particles in the air can enter the products, thereby destroying their sterility. Further, when a powder is utilized between the metallic plate and the flexible inner disc, labels or print will often not stick to the product packages.

Based on the fact that much of the packaging today is still done by hand, and the limitations of the currently available centrifugal precision feeders, it would be advantageous to have precision feeders which could quickly orient and align hard and/or soft packets or pouches of product or parts so as to be in the same direction. This is particularly important with malleable soft pouched products. It would be even more advantageous to accomplish this without the use of a powder between the flexible inner disc and the plate, particularly in food or medical-related fields.

DETAILED DESCRIPTION OF THE PREFERRED EMBODIMENTS

Figure 1:
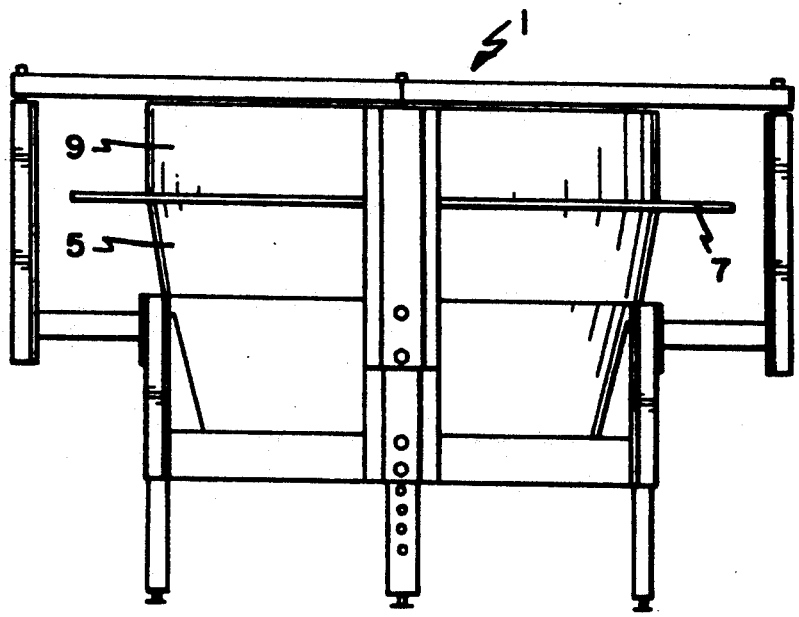
FIG. 1 is a front elevational view of a related art device.

FIGS. 2-7 illustrate the precision pouch feeder 10 of this invention. As shown in the figures, pouch feeder 10 comprises an angled rim 14 attached to a tub or bowl 12 (hereinafter used interchangeably), with rim 14 having ring means comprising a position tooling ring 16, an orienting tooling ring 18, and an exit ramp ring 24. A flexible disc 30 rests on a metallic plate 32 inside bowl 12. In one embodiment, both tub 12 and flexible disc 30 rotate, creating a centrifugal force. It may be possible to reconfigure with other components rotating to achieve similar effect in another embodiment. Packets or pouches 62 (hereinafter used interchangeably) of products or parts, such as food, pharmaceuticals, medical supplies, military special handling devices, or other soft or hard packaged articles, are fed onto flexible disc 30 of the precision feeder 10. By centrifugal force and gravity, packets 62 move from flexible inner disc 30 area to an upright or upstanding position along position tooling ring 16 and an edge 76 of angled rim 14. As packets 62 continue toward orienting tooling ring 18, they pass by a trip bar apparatus. Packets 62 are flipped at the trip bar apparatus, resulting in packets 62 lying flat on the angled, sloped upper surface 84 of angled rim 14. Orientation and alignment of each packet 62 occurs against the wall 90 of the orienting tooling ring 18 and exit ramp ring 24. A plurality of packets 62 are expelled in single file alignment onto an exit ramp conveyor 80 for further processing at the packaging station.

FIG. 1 illustrates a precision feeder currently available. Precision feeder 1 comprises a tub or bowl 5, a flat rim 7, a tooling ring 9, and a flexible, heavy rubber inner disc (not shown) within bowl 5. Packets or pouches are placed in the center of bowl 5 on the flexible, heavy rubber inner disc. Bowl 5 rotates at one speed, and the flexible inner disc rotates at another speed to impart centrifugal force to the packets/pouches. The packets or pouches are transferred from the flexible inner disc to the independently rotating flat rim 7 for delivery to a packing station.

Figure 2:
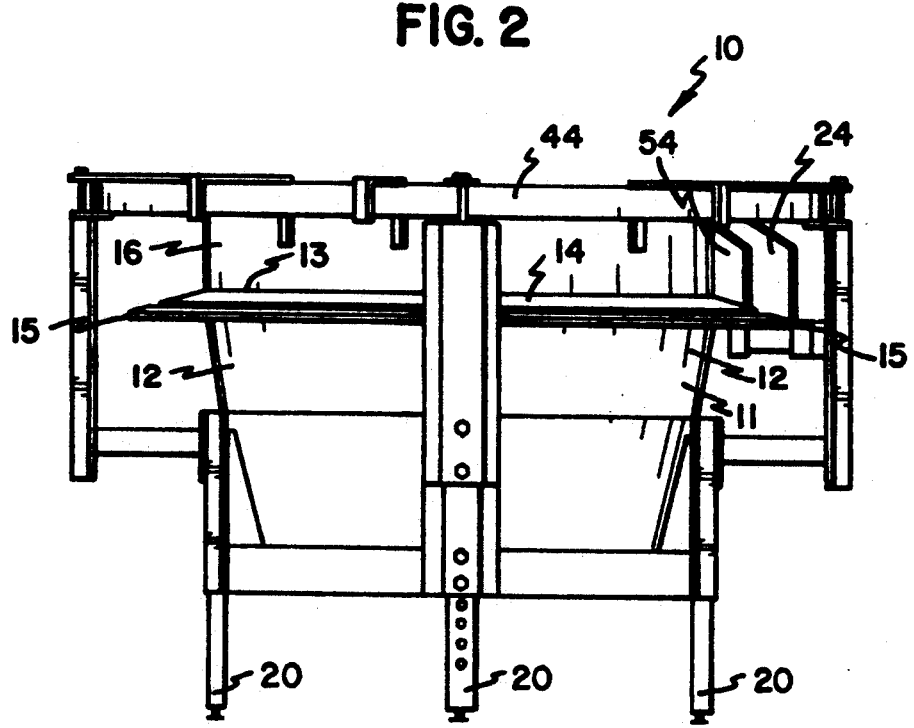
FIG. 2 is a front elevational view of the present invention.

FIG. 2 illustrates an embodiment of the present invention of a precision pouch feeder 10 which comprises a tub or bowl 12 (hereinafter referred to interchangeably), angled orienting rim 14, an outer edge band 44, position tooling ring 16, an orienting tooling ring (not shown), a flexible disc (not shown), guide ring 54, and an exit ramp ring 24.

Bowl 12 may be made from a metallic material commonly used in the field, such as cast aluminum. Bowl 12 is generally circular in shape. The diameter of bowl 12 may vary but is preferably from about thirty to sixty inches in diameter, although fifty inches in diameter is most preferable. A liner of non-metallic material, such as plastic, can be positioned on an inside surface of bowl 12 for protection of bowl 12 or for applications where a metallic surface is not permitted.

Angled orienting rim 14 is substantially circumferentially arranged about bowl 12 and is therefore of a generally circular shape, with a diameter slightly larger than that of bowl 12. Angled orienting rim 14 can be made from different materials. For pouches or packets containing foodstuffs in the food packaging industry, a food grade plastic which is certified by the Food and Drug Administration should be utilized, such as that sold under the trade name Delrin ®. Delrin ® has been found to be an especially preferable plastic since it does not shed particles which can contaminant the food product. Other approved materials with advantageous properties could also be used. For other applications, such as the pharmaceutical, medical, or military special handling industries, materials such as nylon, BAKELITE ®, or other well known plastics can be utilized. Angled rim 14, along with orienting tooling ring 16 and exit ramp ring 24, is utilized to orient packets 62 in a desired orientation. Angled orienting rim 14 must be sloped since it has been found that the slope in rim 14 significantly aids in the orienting of packets or pouches 62 which are to be packaged or processed by moving the products toward the outermost part of bowl 12.

Figure 4:
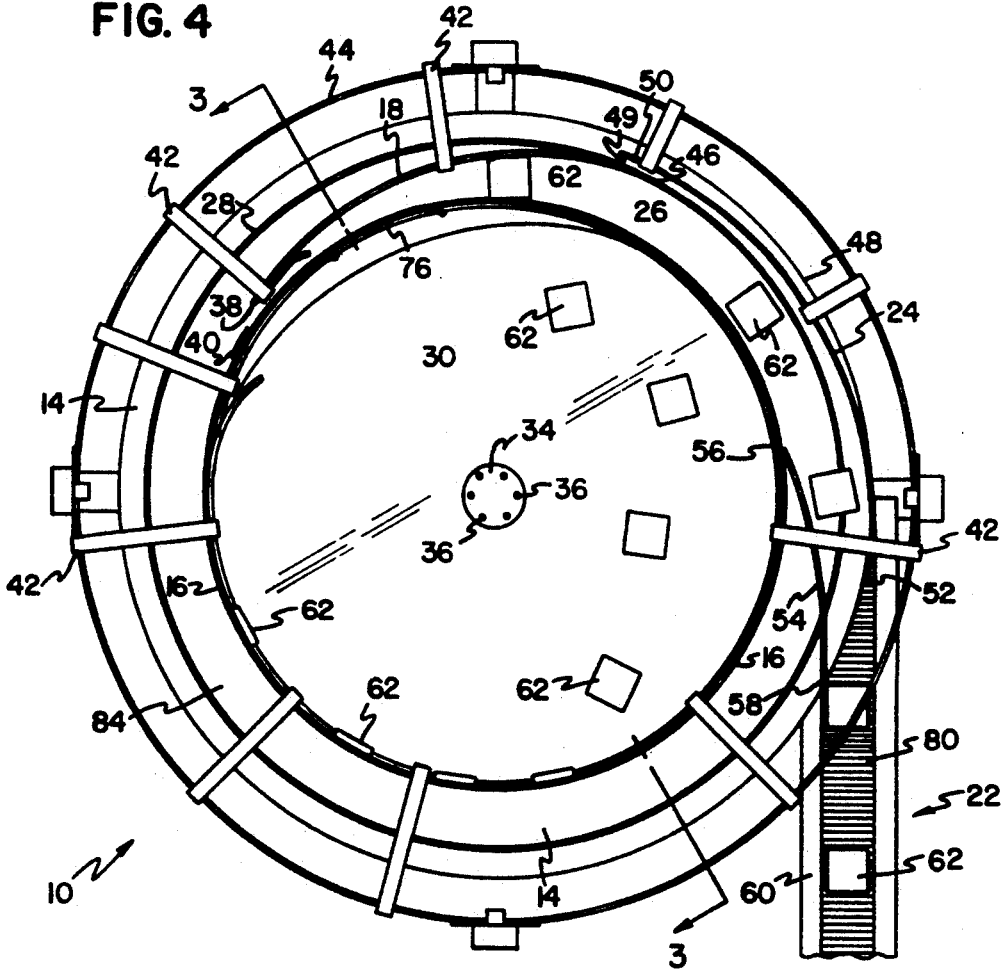
FIG. 4 is a top plan view of the present invention.
Figure 5:
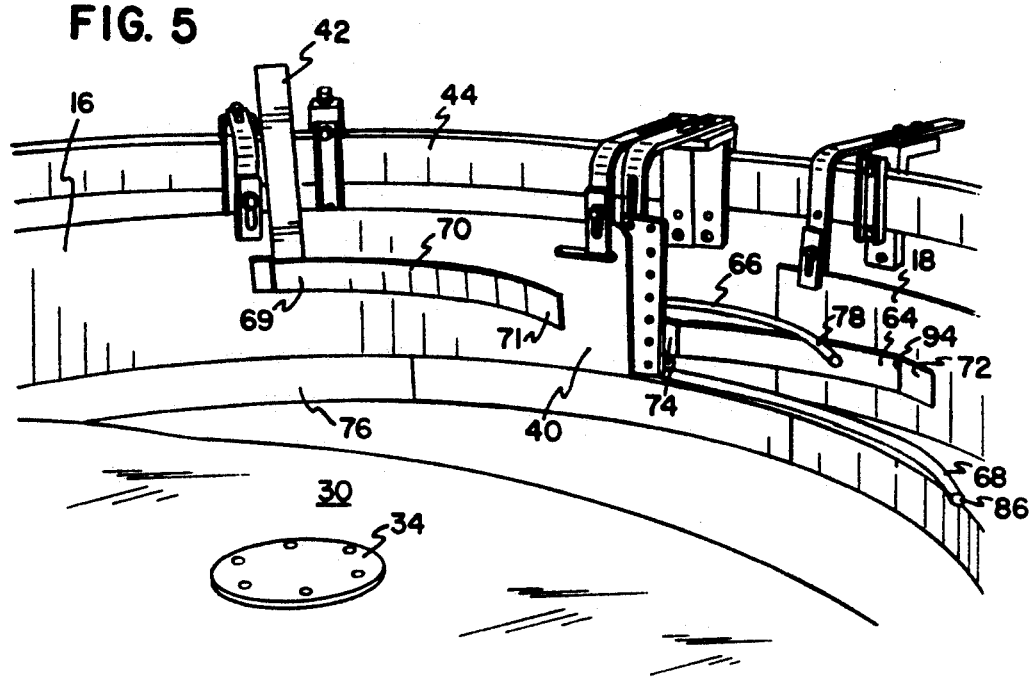
FIG. 5 is a top inner perspective view of the trip bar apparatus and related tooling of the present invention.
Figure 6:
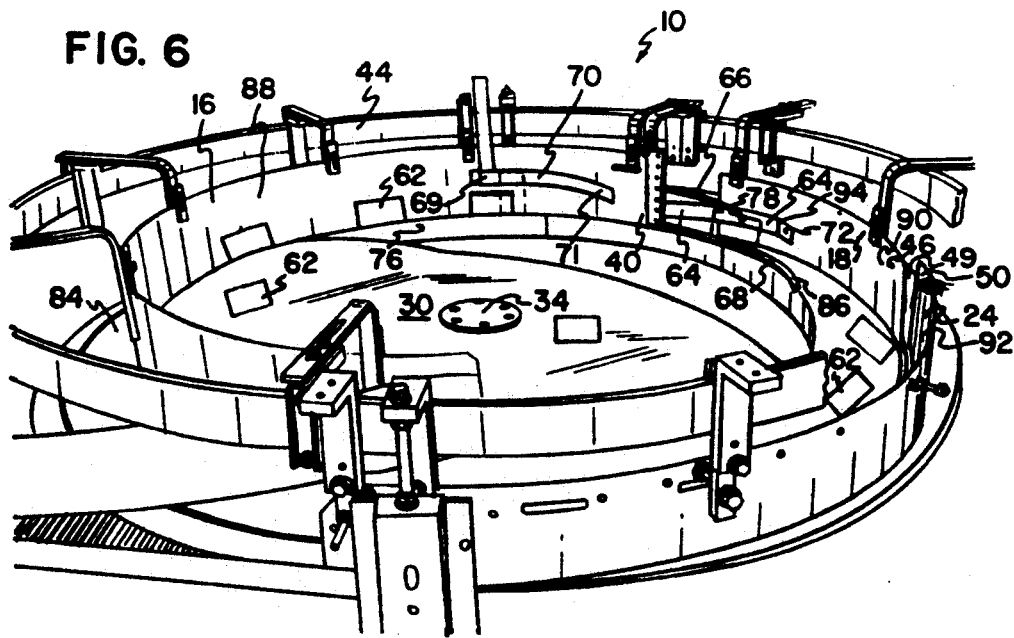
FIG. 6 is a top perspective view of the present invention.

This provides the best configuration for the pouches 62, particularly soft or malleable pouches, for singular positioning and alignment. A flat, i.e. non-angled, rim device does not provide such advantageous positioning. The angle or slope A of rim 14, shown in FIG. 3, varies depending on the size and weight of pouch 62 which is to be processed or packaged. Angled orienting rim 14 is connected to tub 12 using connection means commonly known in the art. Rim 14 slopes in a downward direction away from bowl 12, with the lowest point 15 of rim 14 being farthest away from bowl 12. Position tooling ring 16, best shown in FIGS. 4–6, is provided for positioning packets 62 in an upright orientation against surface wall 88 of position tooling ring 16 as packets 62 are expelled from flexible inner disc 30. Position tooling ring 16 may be made of a metallic or high grade plastic material, preferably stainless steel. The height of position tooling ring 16 may vary depending on the product pouch sizing and other considerations. The length of position tooling ring 16 varies depending on the diameter of bowl 12. Position tooling ring 16 is placed around a portion of the circumference of angled rim 14 in positioning groove 26 on surface 84 of angled rim 14.

Orienting tooling ring 18 aids in positioning and aligning packets 62 as they exit position tooling ring 16 and is made from a plastic or metallic material, preferably stainless steel. The height of orienting tooling ring 18 can vary, and generally matches the height of position tooling ring 16, although this is not always the case. The length of orienting tooling ring 18 varies depending on the diameter of bowl 12.

Exit ramp ring 24 orients and further aligns packets 62, especially any packets 62 which are in a skewed orientation, and is made of a plastic or metallic material, preferably stainless steel. As with position tooling ring 16 and orienting tooling ring 18, the height of exit ramp ring 24 can vary, and can match the height of position tooling ring 16 and orienting tooling ring 18, although it need not. The length of exit ramp ring 24 varies, principally depending on the diameter of bowl 12. FIG. 2 illustrates support legs 20 which may be made of any sturdy and durable material such as stainless steel. Legs 20 can be adjusted up or down to meet the different height requirements of various systems.

Outer edge band 44, shown in FIGS. 2 and 4–6, can be of a diameter larger than bowl or tub 12, although the exact diameter is not critical. Outer edge band 44 is made of a durable material, such as a plastic or metal, preferably stainless steel. Outer edge band 44 is attached to support legs 20 by any method known in the art. Brackets, or clamps 42, or any other suitable securing mechanisms bridge the area between outer edge band 44 and position tooling ring 16, orienting tooling ring 18, and exit ramp ring 24, providing support for the rings 16, 18, 24 and to keep the rings in a fixed and stable position on surface 84 of angled rim 14.

Figure 3:
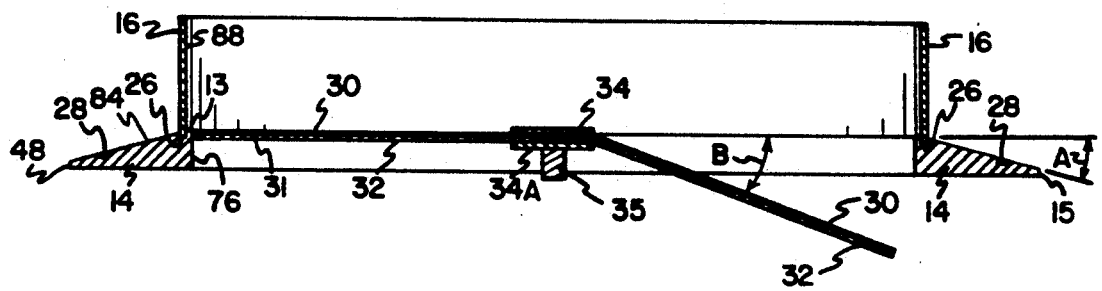
FIG. 3 is a side section elevational view taken generally along line 3—3 of FIG. 4.

As shown in the side section elevation view of FIG. 3, angled rim 14 includes a positioning groove 26 and an orienting groove 28. Position tooling ring 16 is placed in positioning groove 26 on upper surface 84 near inner edge 76 of angled orienting rim 14. Orienting tooling ring 18 (shown in FIG. 4) is positioned in orienting groove 28. Orienting groove 28 is located on upper surface 84 proximate outer edge 48 of rim 14. As illustrated in FIG. 3, flexible, inner disc 30 is positioned above metallic plate 32, including platform 31 of plate 32, in the cavity of bowl 12. Flexible disc 30 is held in place over metallic plate 32 by disc 34. Disc 34 utilizes bolts 36 or other fastening means for attachment of inner disc 30 to metallic plate 34A, as shown in FIGS. 3 and 4.

Conformable, flexible inner disc or mat 30 is of a generally circular shape. The diameter of circular inner disc 30 varies depending on the diameter of bowl 12. Flexible, inner disc 30 can be configured to be at different pitch angles relative to the vertical shaft 35 through disc 34, depending on the weight, size and length of the product which will be packaged as well as the height of angled rim 14. Flexible disc 30 is generally die cast and stamped out from live heavy rubber, i.e., the rubber only bends in one direction, or from a similar type product. Any suitable commercially available live heavy rubber can be utilized. Flexible inner disc 30 is anchored only at its approximate center point to plate 32, and preferably by disc 34. Disc 30 spins upon activation of motors causing any packets 62 on its surface to rotate for eventual placement abutting against vertical wall surface 88 of position tooling ring 16.

Plate 32 can be made from various metallic materials, such as aluminum. Plate 32 is also positionable at different pitch angles, depicted in FIG. 3 as angle B, depending on the product to be packaged. Metal plate 32 slopes in a downward direction from disc 34, in a generally dome-like configuration, except where platform 31 of plate 32, best shown in FIGS. 3 and 7, forms a ramp-type structure adjacent position tooling ring 16 which is generally flush or level with the highest point 13 of angled rim 14. Brackets (not shown) having long set screws (not shown) are positioned under plate 32. When the long set screws are turned in and out, the pitch angles of plate 32 is varied to account for differences in weight, size and length of packet 62 since some packets 62 need to be at a higher level to be able to be positioned against position tooling ring 16, and also to account for any thickness or height differences in angled rim 14 which may also require packets 62 to be at a different height so as to be able to be positioned against position tooling ring 16. As a result of the change in pitch angle of plate 32, the pitch angle of flexible disc 30 also changes.

Disc 34 can be made from any type of durable plastic or metallic material, such as aluminum. Disc 34 can be of varying shapes, although a circular shape is preferred. The diameter of a circular disc 34 will likely vary depending on the diameter of bowl 12. It is preferable that disc 34 be of a circular shape since there is less wear on flexible, pliable disc 30 as disc 30 rotates around a circular disc 34 than if there were corners.

Referring now to FIG. 4, the arrangement of pouch feeder device 10 can be more clearly understood. Angled orienting rim 14 includes orienting groove 28 and positioning groove 26, although other grooves may be necessary or desired. Position tooling ring 16 rests in positioning groove 26, and extends in arc-like fashion around approximately one-half of the circumference of rim 14. Brackets 42 or other securing mechanisms are used to secure position tooling ring 16 to outer edge band 44 at several locations along the length of position tooling ring 16. Orienting tooling ring 18 is positioned near positioning groove 26 so that the end 38 of orienting tooling ring 18 overlaps upright tubing 66, trip tubing 68 and diverter bar 64, with a gap being between end 38 of orienting tooling ring 18 and end 40 of position tooling ring 16. End 38 of orienting tooling ring 18 is held in place by bracket 42, or other securing means, which is clamped onto outer edge band 44. End 46 of orienting tooling ring 18 is positioned into orienting groove 28 so that orienting tooling ring 18 forms a slight arc. Orienting tooling ring 18 is also held in position by bracket 42 at a point approximately midway between end 38 and end 46 of orienting tooling ring 18. Exit ramp ring 24 is positioned in an arcuate or curved fashion on angled rim 14 between orienting groove 28 and outer edge 48 of angled rim 14. End 50 of exit ramp ring 24 is positioned to extend beyond end 46 of orienting tooling ring 18 so that an overlap or gap 49 exists between orienting tooling ring 18 and exit ramp ring 24. End 52 of exit ramp ring 24 terminates at exit ramp 22, resting along outer edge 48 of angled rim 14. Brackets 42 extend from outer edge 44 at various points to exit ramp ring 24 so as to secure and maintain exit ramp ring 24 in a fixed and stable position. Guide ring 54 extends from end 56 of position tooling ring 16 to sidewall 60 of exit ramp 22. Bracket 42 is utilized to clamp guide ring 54 and position tooling ring 16 to outer edge band 44 for support and to keep guide ring 54 in a fixed and stable position.

Referring to FIG. 5, position tooling ring 16 is clamped to outer edge band 44 using clamps or brackets 42, or other suitable securing mechanisms. Upright tubing 66 and trip tubing 68 are attached to end 40 of position tooling ring 16, such as by bolts or other suitable fastening means. The height qualifier bar 70 is attached at first end 69 to position tooling ring 16 near end 40 of position tooling ring 16. The distance height qualifier bar 70 is from end 40 of position tooling ring 16 can vary. Height qualifier bar 70 should be positioned above the surface 84 of angled rim 14 so as to be slightly higher than the height of each packet 62, and can vary in length. Height qualifier bar 70 is bent slightly so as to form a partially arcuate shaped member with second end 71 extending away from position tooling ring 16. Second end 71 is utilized to separate multiple packets 62 positioned on position tooling ring 16 from passing toward the trip bar apparatus, and permits only one packet at a time to proceed, forcing the additional packets 62 back onto flexible disc 30.

End 72 of diverter bar 64 is bent at an angle of approximately 30°. Diverter bar 64, upright tubing 66, and trip tubing 68 are attached to and extend from end 40 of position tooling ring 16 by a hinge 74, or by some other means commonly known in the art. Diverter bar 64 is positioned behind upright tubing 66 and trip tubing 78 for packet repositioning as needed. The bend 94 in end 72 of diverter bar 64 rests against orienting tooling ring 18. It is preferable to bend the end portion 78 of upright tubing 66 and end portion 86 of trip tubing 68 to form a slight arc at the ends thereof. Diverter bar 64 and height qualifier bar 70 can be made of metallic or high grade plastic materials, such as aluminum and stainless steel. Upright tubing 66 and trip tubing 68 are generally made of metallic or a high grade plastic material such as aluminum or stainless steel.

In operation, packets or pouches 62 are fed into the precision pouch feeder device 10 as shown in FIGS. 4 and 6 from, for example, a metering machine (not shown) or the like. Precision pouch feeder device 10 is activated by switching on motors (not shown) which causes bowl 12 and flexible inner disc 30 to rotate at a pre-selected speed. Bowl 12 and flexible disc 30 rotate generally in the same direction, and generally at the same speed. However, bowl 12 and disc 30 can rotate at different speeds if a motor with different gear ratios is used, or if two different motors are used. A spinning movement of disc 30 occurs as disc or mat 30 travels over stationary plate 32 and rises up and over platform 31 in a camming-like action. This movement causes packets 62 to rotate around the circumference of bowl 12 on flexible disc 30, eventually lifting and pushing packets 62 against position tooling ring 16. As centrifugal force increases with such rotation, packets 62 gain speed and momentum. If packet 62 has become misshaped, such as occurs with soft-packaged articles, the centrifugal force causes packet 62 to regain its correct shape. The movement of each packet 62 results in migration from an original position on flexible disc 30, up onto platform 31, toward inner edge 76 of angled rim 14, and then to a snug and vertically oriented position against upstanding surface 88 of position tooling ring 16. Centrifugal force and surface 88 of position tooling ring 16 causes packet 62 to stand on edge so that one edge of packet 62 is positioned on inner edge 76 of angled rim 14. Centrifugal force and gravity keep packet 62 moving along upstanding surface wall 88 of position tooling ring 16 toward height qualifier bar 70. Packet 62 will then normally pass under height qualifier bar 70 and proceed toward the trip bar apparatus made up of upright tubing 66 and trip tubing 68. As packet 62 passes end 40 of position tooling ring 16, it is positioned between trip tubing 68 and the diverter bar 64. Upright tubing 66 keeps packet 62 from entering the orienting area of orienting tooling ring 18 and exit ramp ring 24 if packet 62 is in an incorrect orientation. Packet 62, still being propelled by centrifugal force and gravity (as encouraged by the angle A of angled rim 14), passes end 72 of diverter bar 64, and trips over trip tubing 68 to be recovered by upper surface 84 of angled rim 14 as shown in FIG. 6. Packet 62 is then positioned in a flat orientation to, and on top of, angled rim 14. Orienting tooling ring 18 orients and aligns flat, sloped packet 62 using the upstanding surface 90 of orienting tooling ring 18. As can be seen in FIG. 4, packet 62, still being pushed forward by centrifugal force and gravity, continues along upper surface 84 of angled rim 14, and along the upstanding surface 92 of exit ramp ring 24 to exit ramp 22.

Packet 62 is moved and guided onto exit ramp 22 utilizing guide ring 54 and exit ramp ring 24. Conveyor means, such as moving conveyor 80, of exit ramp 22 is arranged so as to receive packet 62, and carry packet 62 to the area where it will be placed in boxes or other containers. Pouch feeder device 10 of the present invention is particularly advantageous to the packaging operation of products since all packets 62 are quickly aligned and/or registered in the same direction so as to permit rapid and convenient packaging. For example, the alignment process may take only about 0.25 to 2 seconds from the time packets 62 are placed on flexible disc 30 to the time packets 62 reach exit ramp 22.

Referring again to FIG. 6, the situation is illustrated wherein more than one packet 62 will arrive at height qualifier bar 70 at a time. If this is the case, height qualifier bar 70 is positioned so as to let only one packet 62 at a time pass through enroute to exit ramp 22. If more than two packets 62 arrive simultaneously at height qualifier bar 70, packet 62 nearest upstanding surface 88 of position tooling ring 16 will pass through so as to proceed toward exit ramp 22, as discussed above. The second packet 62 which is farthest from upstanding surface 88 of position tooling ring 16 will fall off inner edge 76 onto flexible disc 30. The second packet 62 will go through the procedure described above, namely, gaining speed and momentum on flexible disc 30 so as to be forced against upstanding surface 88 of position tooling ring 16 to start the process over again.

As also shown in FIG. 6, should a packet 62 become misaligned after leaving end 72 of diverter bar 64, the present invention precision pouch feeder 10 will realign packet 62 when it passes end 46 of orienting tooling ring 18. When packet 62 passes end 46 of orienting tooling ring 18, packet 62 is forced against exit ramp ring 24 because of gap 49 between orienting tooling ring 18 and exit ramp ring 24. Disoriented or skewed packet 62 is realigned by the impact of packet 62 on upstanding surface 92 of exit ramp ring 24 after passing gap 49 and end 46 of orienting tooling ring 18. In other words, the movement of the packet outwardly and downwardly toward exit ramp ring 24 causes self-adjustment of each packet into proper alignment. Packet 62 is then in correct alignment and orientation against exit ramp ring 24.

Packet 62 can be of varying sizes and shapes, and can be made from a wide variety of materials, such as a flexible plastic, paper, cellophane, or cardboard. Further, packet 62 can be used to house a wide variety of products or parts, including, but not limited to, food, pharmaceuticals, medical devices, or military special handling devices. The weight of packet 62 will vary depending on the product or part contained within packet or pouch 62.

Precision pouch feeder device 10 may be used for a wide variety of products. Precision pouch feeder device 10 is particularly useful in the food packaging industry, although the pouch feeder device can be utilized, for instance, in the medical, pharmaceutical, and military special handling industries, as well as other industries. Pouch feeder device 10 has been found to be particularly useful for packets 62 containing foodstuffs such as frosting, pizza sauce, mozzarella cheese, ice cream sandwich bars, oatmeal, convenience hamburger mixes, potatoes, and the like. As can be appreciated, the pitch angle(s) of flexible disc 30, plate 32 and angled rim 14 can be varied to accommodate different types and weights of products contained within packet 62.

Figure 7:
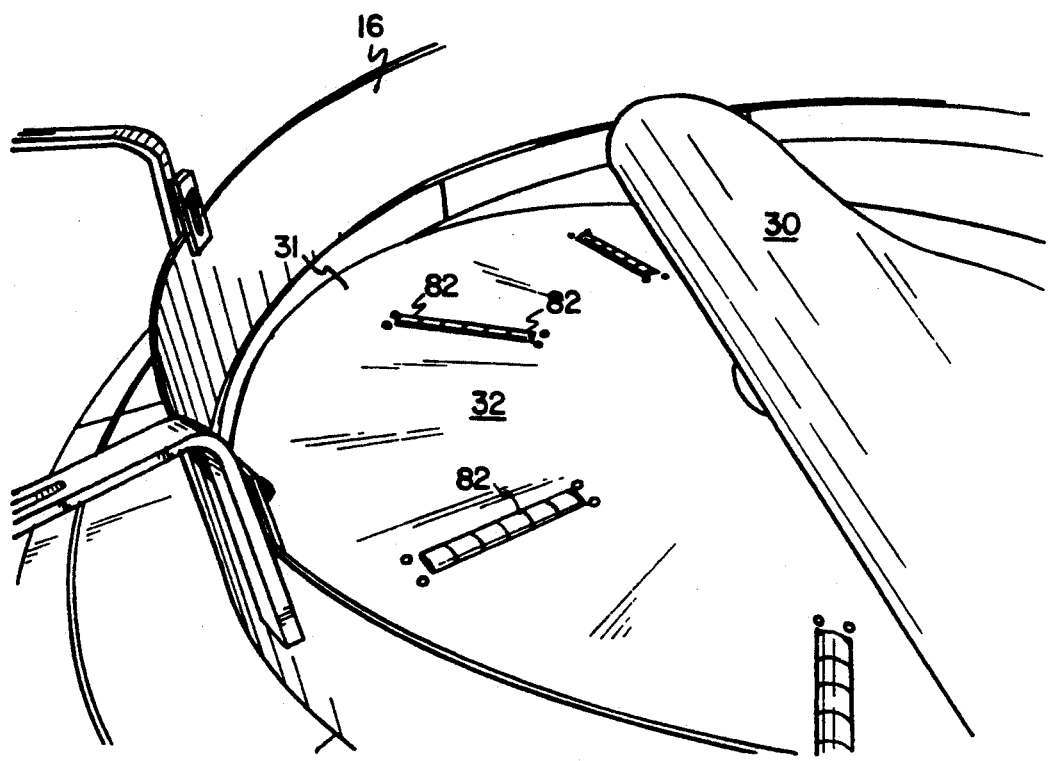
FIG. 7 is a top perspective partial view of the present invention with the flexible disc partially folded back to illustrate the free-spinning divided rollers.

FIG. 7 illustrates metal plate 32 located underneath flexible disc 30. Free spinning, divided rollers 82 are positioned on plate 32 so as to break and relieve the surface tension between plate 32 and flexible disc 30. Rollers 82 can be made of varied materials, such as a high grade plastic known by the trade name of Delrin ®. The number of rollers 82 and the position of each roller 82 group can be varied. It has been found that seven to eight groups of rollers 82 is sufficient to relieve the surface tension between plate 32 and flexible disc 30 in a fifty inch diameter bowl 12. Rollers 82 are advantageous especially for packaging of products in the food or medical industry, or for products to which labels or print will be affixed, since no powder is needed to break the surface tension between plate 32 and flexible disc 30. Thus, any possibility of contamination or loss of sterility of the food or medical products or failure of labels or print to adhere to the product pouches 62 due to use of a powder is eliminated.

An example of dimensions of a preferred embodiment of pouch feeder device 10 is described in Table I below, although it is understood that other embodiments within the scope of this invention are possible:

TABLE I

| Component | Dimension |
|---|---|
| Bowl 12 | Diameter of 50 inches; Height |

TABLE I-continued

| Component | Dimension |
| --- | --- |
| Angled rim | of inches (or feet)<br>Diameter of 64 inches; angle of five to twenty, preferably 15°. |
| Position Tooling Ring 16 | Height of five to ten, preferably seven inches; 96 inches in length. |
| Orienting Tooling Ring 18 | Height of five to ten, preferably seven inches; 24 to 48 inches in length; Overlaps trip tubing 66 and diverter bar 64 by two to six inches. |
| Exit Ramp Ring 24 | Height of five to ten, preferably seven inches and at least sixty inches in length. Overlaps orienting tooling ring 18 by two to four inches. |
| Legs 20 | Can be adjusted by inches or feet. |
| Outer edge band 44 | Diameter of seventy two inches. |
| Disc 30 | Diameter of about forty-eight inches. Pitch angle of five to twenty, preferably 10°. |
| Plate 32 | Pitch angle of five to twenty, preferably 10°. |
| Disc 34 | Diameter of six inches. |
| Height Qualifier Bar 70 | Twelve to eighteen, preferably twelve inches from end 40 of position tooling ring 16. Length six to twelve inches. Height of packet 62 plus 0.25 inches from surface 84 of rim 14. Bent to approximate 30°. angle. |
| Upright Tubing 66 | Diameter of 0.25 inch to one inch. Extends eight to sixteen inches from end 40 of position tooling ring 16. Height of packet 62 plus 0.25 inches from surface. End 84 of rim 14 bent 30°. |
| Trip Tubing 68 | Diameter of 0.5 to one inch. Extends twelve to twenty-four, preferably eighteen inches from end 40 of position tooling ring 16. 0.040 to 0.060 inches, preferably 0.040 inches from surface 84 of rim 14. End 86 bent 30°. |
| Diverter Bar 64 | Length of four to twelve, preferably twelve inches; length of end 72 is one to three, preferably two inches. End 72 bent 30°. |
| Rollers 82 | Length of each roller 82 is 0.75 to 1.25 inches. |

Pouch feeder device 10 has many advantages for the food, medical, pharmaceutical and military special handling industries since when various sizes and weights of packets 62 are placed in the pouch feeder device 10, a single-file, correctly aligned stream of packets 62 is obtained at the packaging station. Precision pouch feeder 10 can be utilized for large quantities of packets 62 which need to be packaged. Further, pouch feeder device 10 quickly orients and aligns packets 62, since hundreds of packets per minute can be aligned using pouch feeder device 10, depending on the size and weight of packet 62. In addition, pouch feeder device 10 permits quicker packaging of the packets 62 because of the correct alignment of packets 62. Further, packets 62 can be placed on flexible disc 30, and even if packets 62 are compressed or not in a correct or uniform shape, the centrifugal force acting on the packets 62 as they travel on disc 30 forces the materials inside packet 62 to return to the correct shape or size. Since no powder is utilized to reduce friction between plate 32 and flexible disc 30, precision feeder device 10 can be utilized for a wide variety of industries which require a sterile environment, or have concerns regarding contamination of products, such as the medical or optical industries, or in industries where labels or print is affixed to the packets.

While the invention has been explained fully in the detailed discussion found above of the specific embodiments of the invention, many embodiments of the invention can be made without departing from the spirit and scope of the invention. Specific structural and functional details disclosed herein are not to be interpreted as limiting, but rather as a basis for the claims and as a representative basis for teaching one skilled in the art to variously employ the present invention in virtually any appropriately detailed system or structure.

What is claimed is:

1. An apparatus for precision feeding and alignment of product packets for subsequent packaging comprising:
   a) a bowl-like rotatable vessel having walls comprising an inner surface, a top surface, and an outer surface, the inner surface forming a vessel cavity suitable for receipt of a plate, a flexible disc, and product packets therein:
   b) an angled rim positioned on the top surface of the vessel walls, the rim being angled sot hat a rim inner surface is proximate the all inner surface and is positioned higher than a rim outer surface;
   c) a plate positioned within the vessel cavity between the inner surfaces of the vessel walls, the plate having an upper surface and a lower surface;
   d) a rotatable and flexible disc positioned substantially entirely on the plate upper surface, the disc being suitable for receiving product packets thereon, wherein the flexible disc and the vessel rotate to move the product packets from positions on the disc to the angled rim top surface; and
   e) ring means extending vertically from placement on the angled rim so that product packages are uniformly aligned by the angled rim and the ring means;
   wherein the ring means comprises an inner positioning ring and an outer orienting ring, the inner positioning ring comprising an interrupted ring having first and second ends.

2. The apparatus of claim 1, wherein the angled rim includes a first groove for receiving the positioning ring and a second groove for receiving the orienting ring.

3. The apparatus as set forth in claim 1, further comprising tubing extending from the first end of the inner positioning ring, the tubing permitting passage of correctly oriented packets to the outer orienting ring.

4. The apparatus as set forth in claim 3, further comprising trip tubing extending from the first end of the positioning ring, the trip tubing being utilized to position the packet in a substantially flat orientation on the angled rim with each packet abutting a portion of the outer orienting ring.

5. The apparatus as set forth in claim 3, further comprising a height qualifier bar proximate the first end of the inner positioning ring, the height qualifying bar permitting passage of only a single packet to the tubing at a time.

6. The apparatus of claim 5, further comprising a diverter bar located proximate the first end of the positioning ring, the diverter bar permitting only a single packet to pass thereby while diverting any second simultaneously arriving packet back onto the rotatable and flexible disc.

7. A method for aligning and orienting product packets to be packaged, comprising the steps of:
   a) providing a rotatable tub comprising an inner region defined by wall members and a central surface, said wall members comprising circumferential lower walls and a plurality of upper rings, including an inner positioning ring having a first end and an outer orienting ring, both the positioning ring and the orienting ring being mounted in a circumferential angled rim having an inner upper edge and a lower outer edge, said central surface comprising a separate rigid plate member and a flexible disc overlayed on the rigid plate member;
   b) activating the flexible disc and the rotatable tub so that the flexible disc and the tub rotate;
   c) placing product packets on the rotating flexible disc so that the packets are moved toward the wall members of the tub by the rotation of the tub and the flexible disc;
   d) positioning the packets in an upstanding position on the angled rim and against the positioning ring;
   e) moving the upstanding packets to the first end of the positioning ring;
   f) tripping each of the upstanding packets sequentially so that each packet lays flat on the surface of the angled rim; and
   g) transporting the packets to an outer orienting ring so that all of the packets are uniformly aligned in the same direction for subsequent movement to a next packaging area.

* * * * *

UNITED STATES PATENT AND TRADEMARK OFFICE
CERTIFICATE OF CORRECTION

PATENT NO. : 5,299,675

DATED : April 5, 1994

INVENTOR(S) : Schumann et al.

It is certified that error appears in the above-identified patent and that said Letters Patent is hereby corrected as shown below:

Column 10, Line 28, DELETE "sot hat" and INSERT therefor --so that--

Column 10, Line 29, DELETE "all" and INSERT therefor --wall--

Signed and Sealed this

Sixteenth Day of August, 1994

BRUCE LEHMAN

Attest:

Attesting Officer

Commissioner of Patents and Trademarks